(12) United States Patent
Chowdhury

(10) Patent No.: US 6,796,272 B1
(45) Date of Patent: Sep. 28, 2004

(54) TEATCUP LINER AND FAMILY

(76) Inventor: Mofazzal H. Chowdhury, 1301 Bahringer Ct., Sun Prairie, WI (US) 53590-1550

( * ) Notice: Subject to any disclaimer, the term of this patent is extended or adjusted under 35 U.S.C. 154(b) by 0 days.

(21) Appl. No.: 10/600,166

(22) Filed: Jun. 19, 2003

Related U.S. Application Data

(63) Continuation-in-part of application No. 10/071,332, filed on Feb. 8, 2002, now Pat. No. 6,631,694.

(51) Int. Cl.$^7$ ................................................. A01J 5/04
(52) U.S. Cl. ................................. 119/14.47; 119/14.46
(58) Field of Search ........................... 119/14.47, 14.46, 119/14.52, 14.54

(56) References Cited

U.S. PATENT DOCUMENTS

| | | | |
|---|---|---|---|
| 3,096,740 A | 7/1963 | Noorlander | 119/14.52 |
| 3,289,634 A | 12/1966 | Simons | 119/14.52 |
| 3,659,558 A | 5/1972 | Noorlander | 119/14.52 |
| 3,967,587 A | 7/1976 | Noorlander | 119/14.49 |
| 4,269,143 A | 5/1981 | Erbach | 119/14.49 |
| 4,530,307 A | 7/1985 | Thompson | 119/14.49 |
| 4,537,152 A | 8/1985 | Thompson | 119/14.54 |
| 4,610,220 A | 9/1986 | Goldberg et al. | 119/14.47 |
| 5,178,095 A | 1/1993 | Mein | 119/14.47 |
| 5,218,924 A | 6/1993 | Thompson et al. | 119/14.02 |
| 5,291,853 A | 3/1994 | Steingraber et al. | 119/14.54 |
| 5,482,004 A | 1/1996 | Chowdhury | 119/14.52 |
| 5,493,995 A | 2/1996 | Chowdhury | 119/14.54 |
| 5,752,462 A | 5/1998 | Petersson | 119/14.47 |
| 6,039,001 A | 3/2000 | Sanford | 119/14.47 |
| 6,055,931 A | 5/2000 | Sanford, Jr. | 119/14.36 |
| 6,176,200 B1 | 1/2001 | Petterson | 119/14.47 |
| 6,308,656 B1 | 10/2001 | Milbrath et al. | 119/14.47 |
| 6,435,132 B1 | 8/2002 | Milbrath et al. | 119/14.47 |
| 6,631,694 B1 * | 10/2003 | Chowdhury | 119/14.46 |

FOREIGN PATENT DOCUMENTS

| | | |
|---|---|---|
| GB | 975757 | 11/1964 |
| NZ | 507213 | 9/2000 |

* cited by examiner

*Primary Examiner*—Charles T. Jordan
*Assistant Examiner*—Elizabeth Shaw
(74) *Attorney, Agent, or Firm*—Andrus, Sceales, Starke & Sawall, LLP

(57) ABSTRACT

A teatcup liner series, having n liners $L_1$ through $L_n$, enables selection of faster milking or less liner slip. A liner and/or the series is provided with variable groove width and/or material. A cost advantaged manufacturing method is provided.

38 Claims, 11 Drawing Sheets

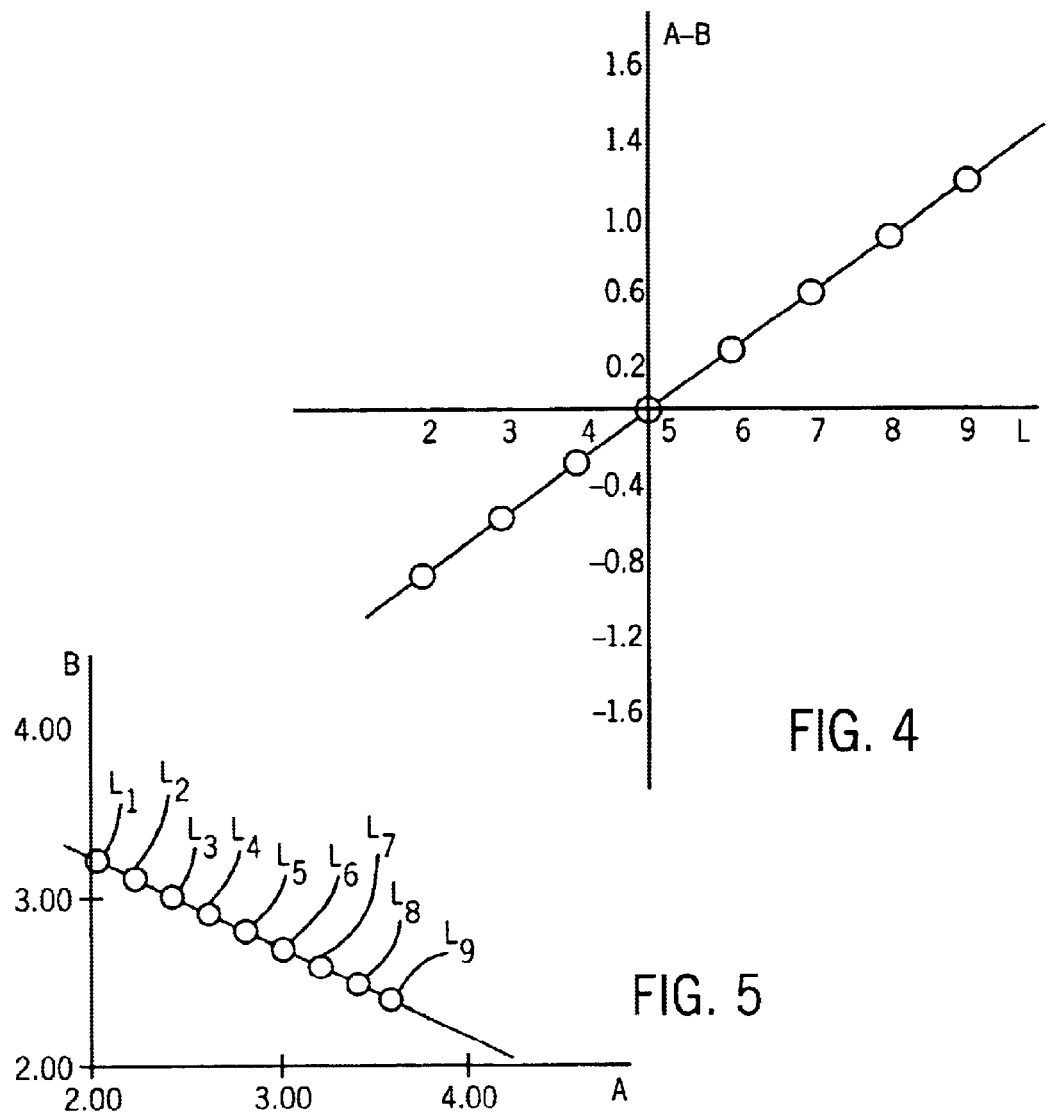
FIG. 4
FIG. 5
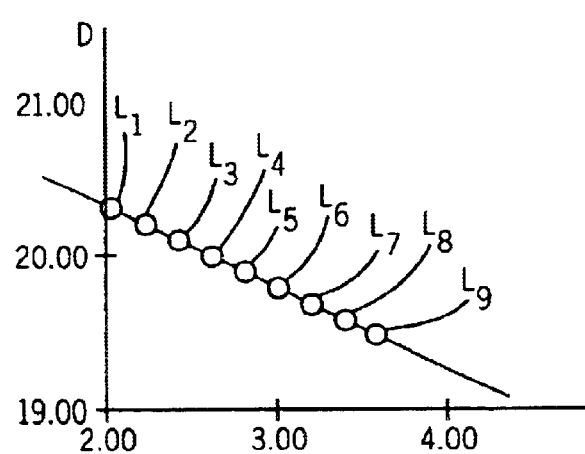
FIG. 6

TEATCUP LINER AND FAMILY

CROSS-REFERENCE TO RELATED APPLICATION

This application is a continuation-in-part of U.S. patent application Ser. No. 10/071,332, field Feb. 8, 2002, now U.S. Pat. No. 6,631,694.

BACKGROUND AND SUMMARY

1. Parent Application

The invention of the noted parent application relates to teatcup liners for use in a teatcup assembly for milking a mammal.

As known in the prior art, a plurality of teatcups are connected to respective teats suspending from the udder of a mammal such as a cow. Each teatcup assembly has a teatcup liner or inflation around a respective teat and defining a milk flow passage within the liner below the teat, and a pulsation chamber outside the liner between the liner and the teatcup shell, for example U.S. Pat. Nos. 4,269,143, 4,530,307, 5,178,095, 5,218,924, 6,055,931, all incorporated herein by reference. The system has a milking cycle with an on portion and an off portion. Milk flows from the teat towards a milking claw during the on portion, and then to a storage vessel. During the off portion, the liner is collapsed around the teat, to aid in the circulation of body fluids. Vacuum is continuously applied to the milk flow passage within the liner. Vacuum is alternately and cyclically applied to the pulsation chamber between the liner and the teatcup shell, to open and close the liner, all as is known.

The parent invention provides a liner series or family enabling the dairyman selectivity in choosing between the trade-off of liner slip versus milk harvest and milking speed. During continuing development efforts, various relationships have been discovered between various liner parameters, and in accordance therewith, a liner series has been developed having at least one and preferably a plurality of parameters which vary liner to liner in optimized manner to afford the noted selectivity.

In a further aspect of the parent invention, a particularly cost effective manufacturing method is provided for producing the liner series.

2. Present Invention

The present invention evolved during continuing development efforts related to the above-noted parent invention. Further options are provided enabling the dairyman selectivity in choosing higher milking speed or less liner slip. Further improvements in individual liner construction have also been developed.

BRIEF DESCRIPTION OF THE DRAWINGS

Parent Application

FIG. 4 is a graphical plot of a selected parameter which varies in accordance with the parent invention.

FIG. 5 is a graphical plot of the variance of a pair of parameters versus each other in accordance with the parent invention.

FIG. 6 is a graphical plot of the variance of another pair of parameters versus each other in accordance with the parent invention.

Present Invention

Figure 3:
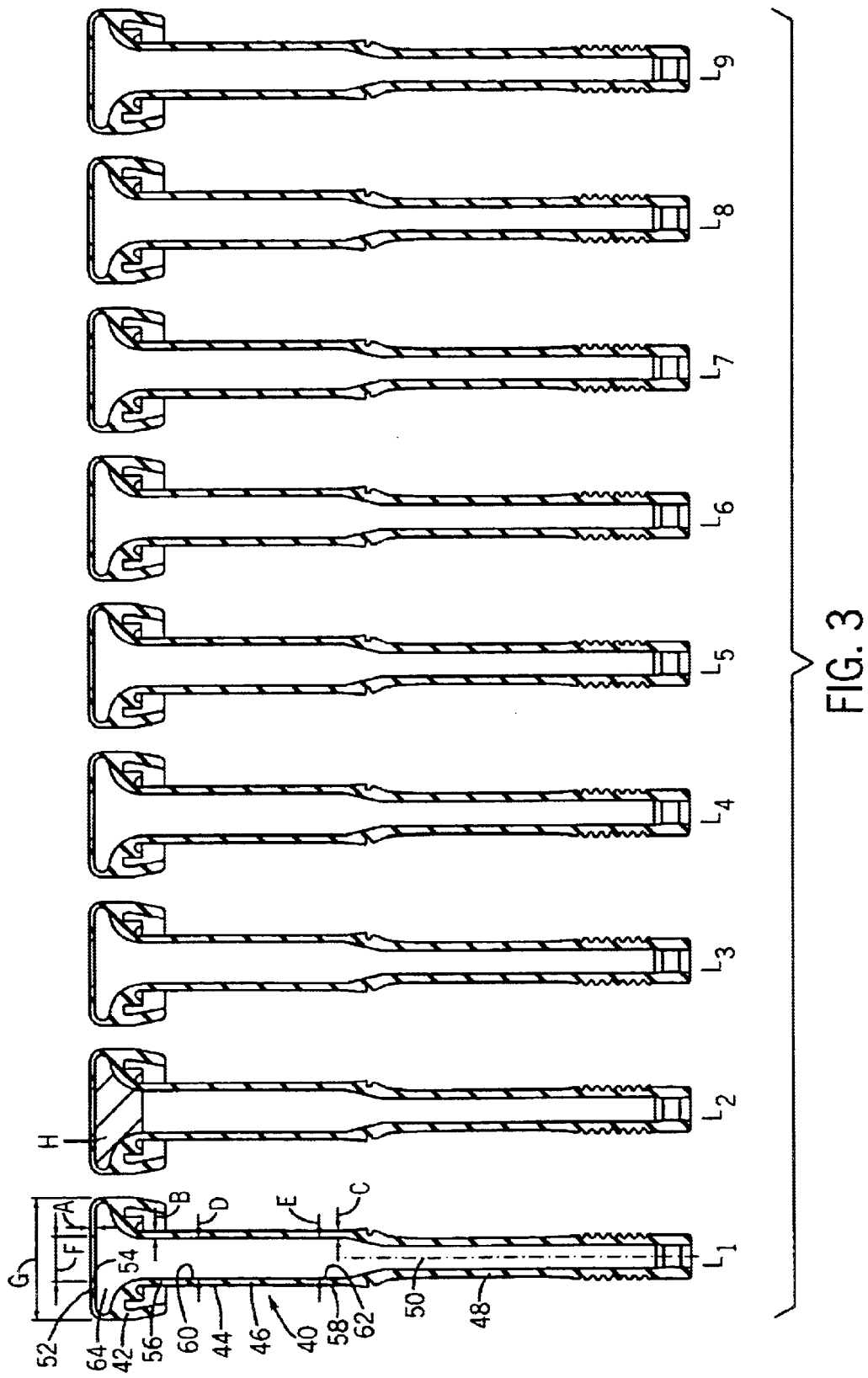
FIG. 3 shows a teatcup liner series in accordance with the parent invention.
Figure 17:
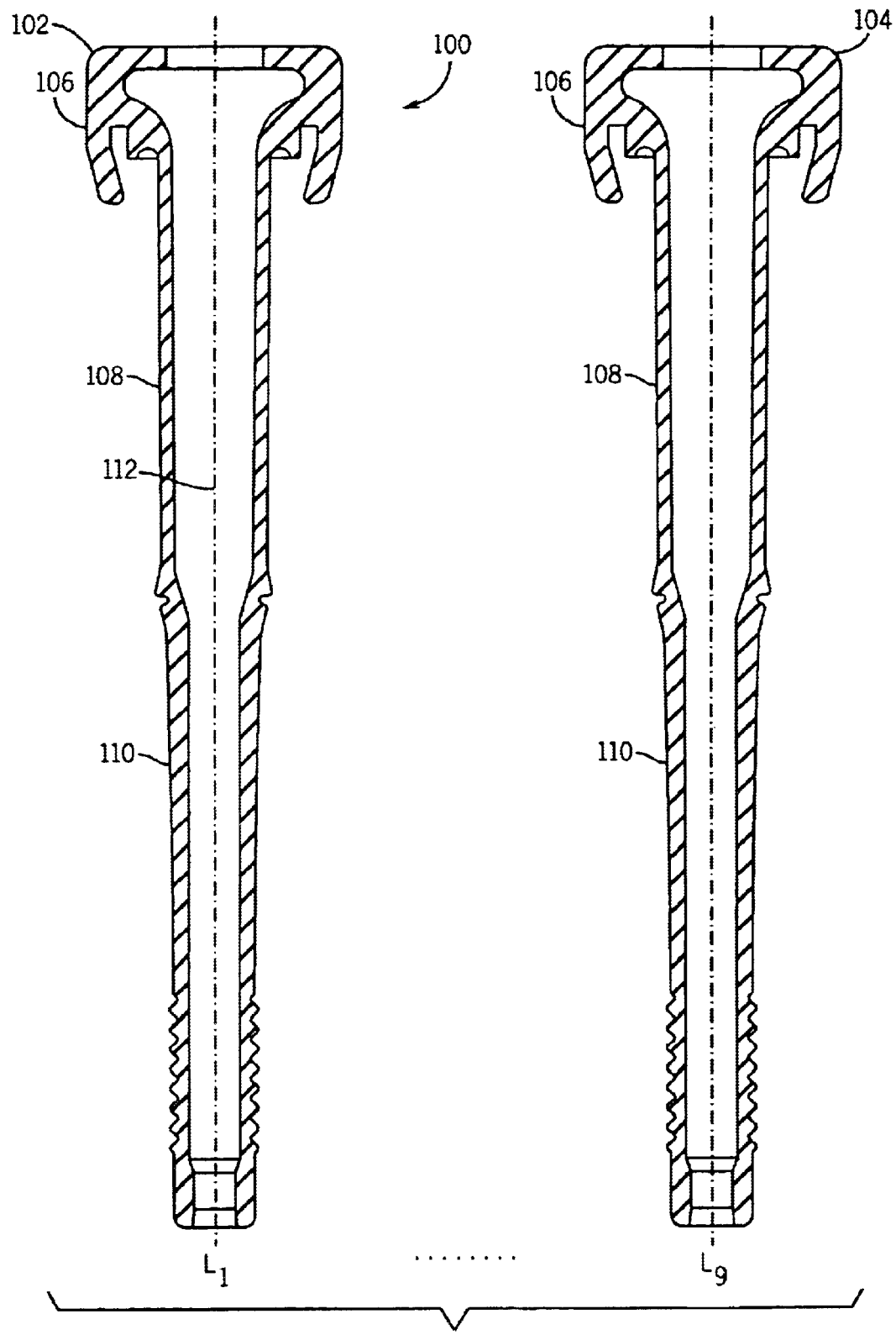

FIG. 17 is a side sectional view similar to FIG. 3 and illustrating the first and last liners in the series in accordance with the present invention.

Figure 18:
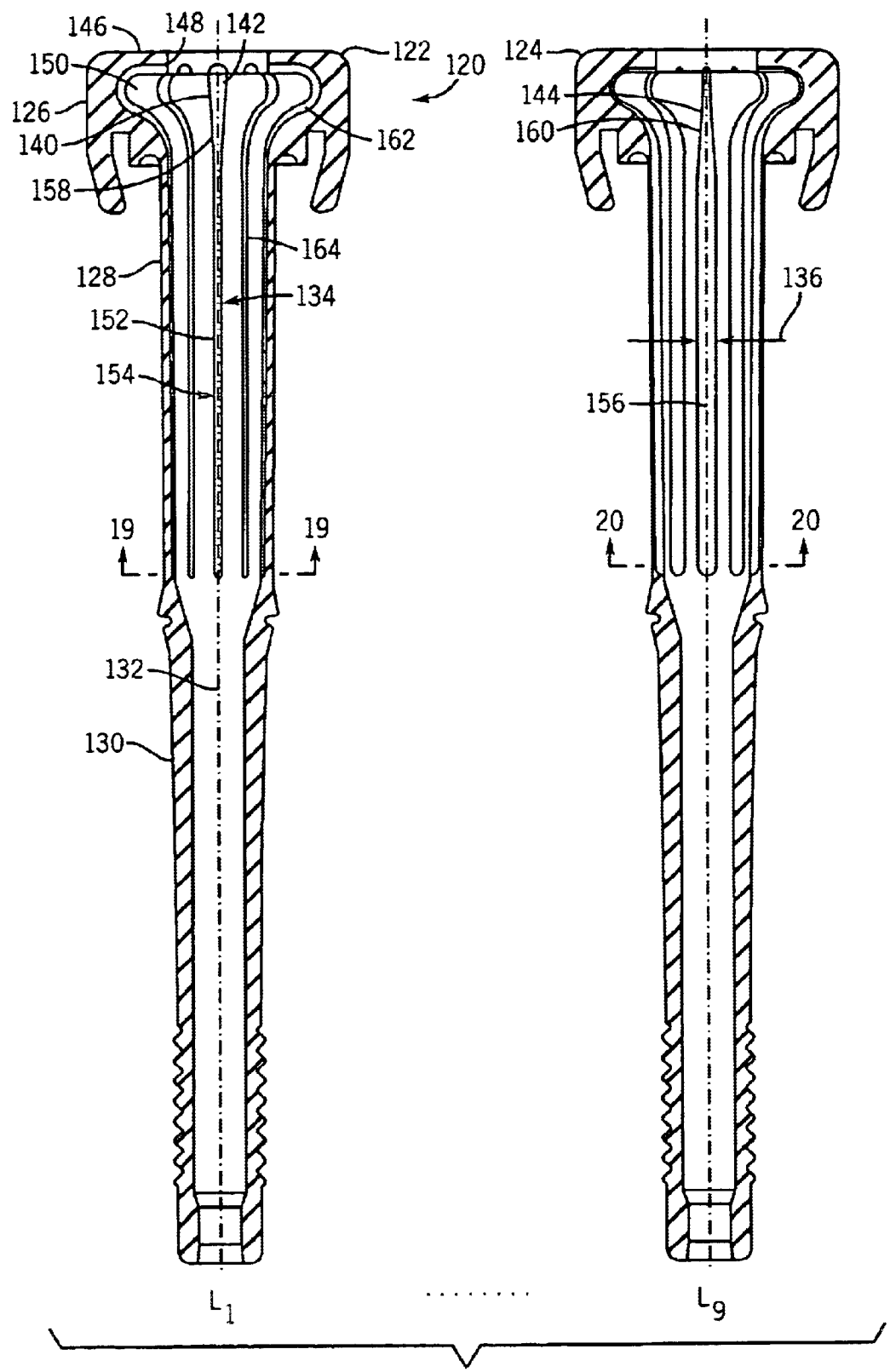

FIG. 18 is like FIG. 17 and shows another embodiment.

Figure 19:
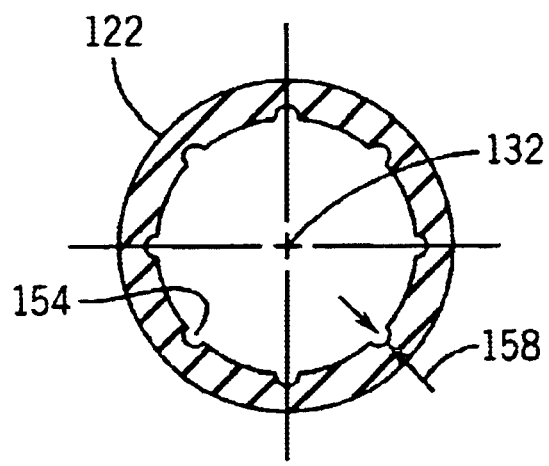

FIG. 19 is a sectional view taken along line 19—19 of FIG. 18.

Figure 20:
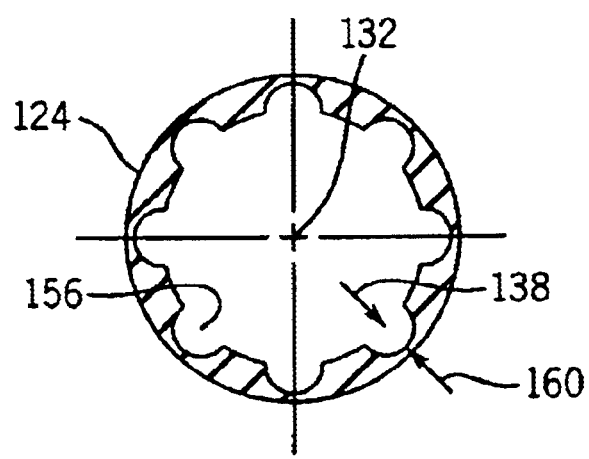

FIG. 20 is a sectional view taken along line 20—20 of FIG. 18.

Figure 21:
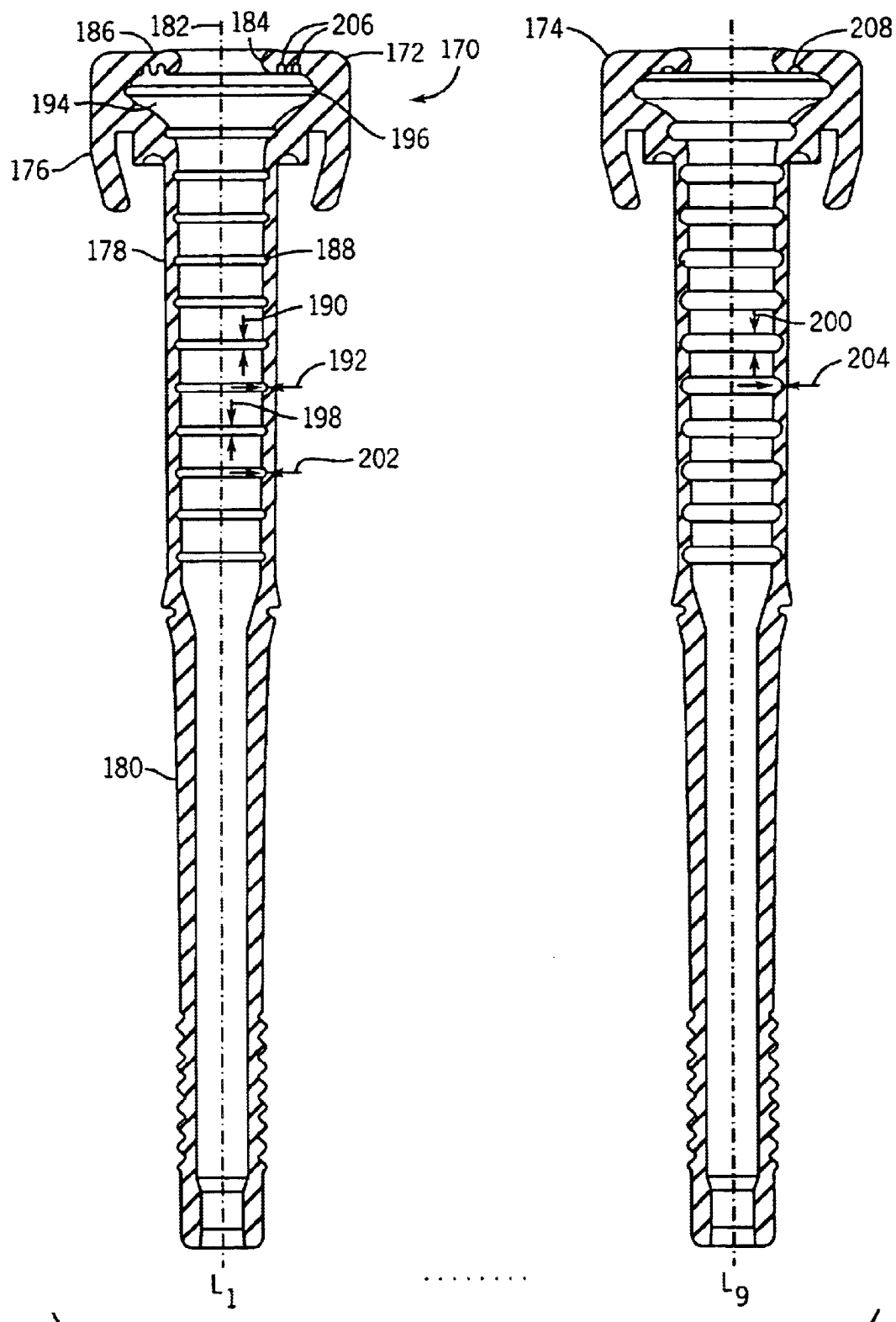

FIG. 21 is like FIG. 18 and shows another embodiment.

DETAILED DESCRIPTION OF THE INVENTION

Parent Application

Figure 1:
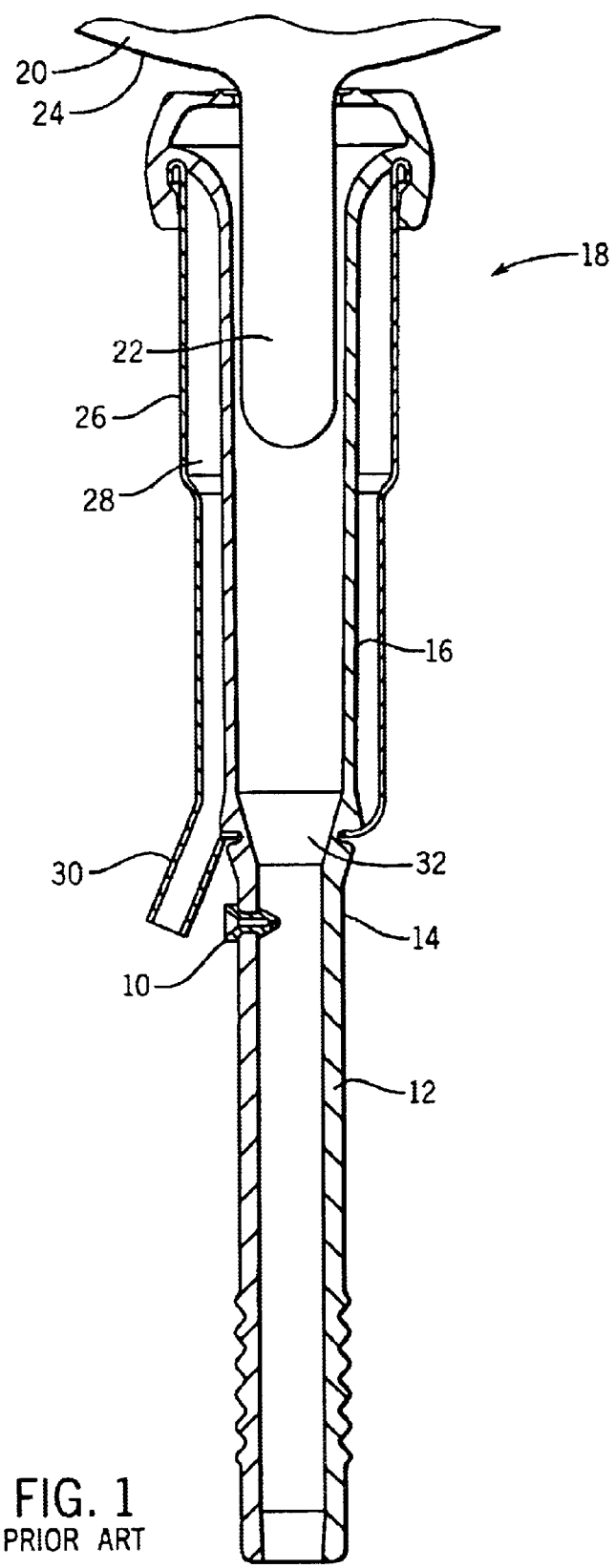
FIG. 1 is taken from U.S. Pat. No. 6,055,931 and is a side view partially in section of a teatcup assembly including a teatcup liner for milking a mammal.
Figure 2:
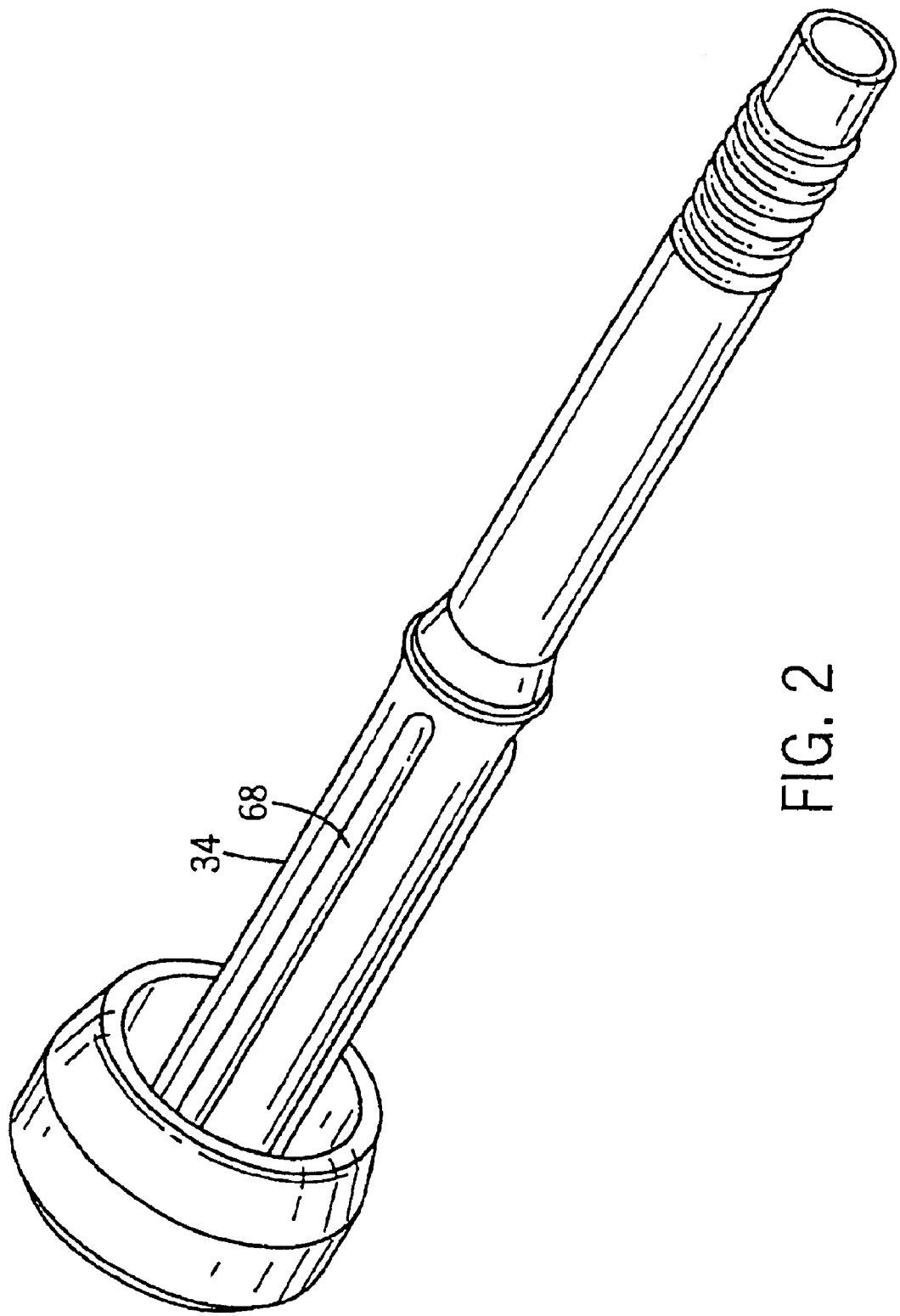
FIG. 2 is an isometric view of a teatcup liner.

FIG. 1 shows a teatcup assembly 18 for milking a mammal 20 such as a cow. Teat 22 suspending from udder 24 of the mammal extends into the liner. Teatcup shell 26 is typically a metal, or plastic, member defining an annular pulsation chamber 28 around liner 16 between the liner and the teatcup shell and having a pulsation port 30 for connection to a pulsator valve, as is known. Liner 16 is typically rubber or other flexible material. The lower end of milk tube portion 14 of the liner is connection to a claw, for example, U.S. Pat. Nos. 4,537,152 and 5,291,853, incorporated herein by reference, which in turn supplies milk to a storage vessel. As noted above, vacuum is continuously applied to milk passage 32 within the liner through milk tube portion 14, and vacuum is alternately and cyclically applied to pulsation chamber 28 through port 30, to open and close liner 16 below teat 22, all as is known and for which further reference may be had to the above noted incorporated patents. An air vent plug 10 may be inserted through the wall 12 of the milk tube portion 14 of the teat liner, as is known, for example above noted incorporated U.S. Pat. No. 6,055,931. For further background, a teatcup liner is illustrated in isometric view at 34 in FIG. 2.

FIG. 3 illustrates a teatcup liner series in accordance with the parent invention including in combination a plurality of related teatcup liners comprising n liners $L_1$ through $L_n$, for example as shown at the nine liners $L_1$ through $L_9$. Each liner such as 40 has an upper mouthpiece 42, an intermediate barrel 44 defined by a barrel wall 46, and a lower connecting tube 48. The barrel extends along an axial direction 50 for receiving teat 22 inserted axially thereinto through mouthpiece 42. The mouthpiece has an upper lip 52 having an aperture 54 therethrough for receiving teat 22. Lip 52 has an axial thickness A measured parallel to axial direction 50. Barrel wall 46 has axially spaced upper and lower portions 56 and 58. Upper portion 56 of barrel wall 46 has a transverse thickness B measured transversely to axial direction 50. Lower portion 58 of barrel wall 46 has a transverse thickness C measured transversely to axial direction 50. Upper portion 56 of barrel wall 46 has inner surfaces 60 defining a hollow interior with an upper transverse span D thereacross taken transversely to axial direction 50. Lower portion 58 of barrel wall 46 has inner surfaces 62 defining a hollow interior with a lower transverse span E thereacross taken transversely to axial direction 50. Lip aperture 54 has a transverse dimension taken transversely to axial direction 50 and defining a mouthpiece bore F. Mouthpiece 42 has a cavity 64 between lip 52 and barrel 44. Cavity 64 has a transverse dimension taken transversely to axial direction 50 and defining a cavity bore G. Cavity 64 has a volume H.

In one preferred embodiment, the noted parameters A through H are varied liner to liner from $L_1$ through $L_9$ as indicated in the table below, and as set forth in FIG. 3. The table below gives dimensions for A through G in millimeters (mm). For example, the axial thickness A of lip 52 varies from 2.0 mm for liner $L_1$ to 3.6 mm for liner $L_9$. The table gives dimensions in cubic inches ($in^3$) for H.

TABLE

| | LINER | | | | | | | | |
|---|---|---|---|---|---|---|---|---|---|
| | $L_1$ | $L_2$ | $L_3$ | $L_4$ | $L_5$ | $L_6$ | $L_7$ | $L_8$ | $L_9$ |
| A (mm) | 2.0 | 2.2 | 2.4 | 2.6 | 2.8 | 3 | 3.2 | 3.4 | 3.6 |
| B (mm) | 3.2 | 3.1 | 3.0 | 2.9 | 2.8 | 2.7 | 2.6 | 2.5 | 2.4 |
| C (mm) | 2.9 | 2.8 | 2.7 | 2.6 | 2.5 | 2.4 | 2.3 | 2.2 | 2.1 |
| D (mm) | 20.2 | 20.4 | 20.6 | 20.8 | 21 | 21.2 | 21.4 | 21.6 | 21.8 |
| E (mm) | 18.9 | 19.1 | 19.3 | 19.5 | 19.7 | 19.9 | 20.1 | 20.3 | 20.5 |
| F (mm) | 20.4 | 20.3 | 20.2 | 20.1 | 20.0 | 19.9 | 19.8 | 19.7 | 19.6 |
| G (mm) | 52.95 | 52.65 | 52.25 | 51.85 | 51.45 | 51.05 | 50.65 | 50.25 | 49.85 |
| H ($in^3$) | 1.368 | 1.353 | 1.336 | 1.318 | 1.301 | 1.283 | 1.265 | 1.248 | 1.230 |
| A − B (mm) | −1.2 | −0.9 | −0.6 | −0.3 | 0 | 0.3 | 0.6 | 0.9 | 1.2 |

The liner series is characterized by the following relationships, as illustrated in the table and FIG. 3: axial thickness A of lip 52 continually increases from $L_1$ through $L_n$, preferably linearly; transverse thickness of barrel wall 46, including both B and C, continually decreases from $L_1$ through $L_n$, preferably linearly; the transverse span across the hollow interior, including both D and E, continually increases from $L_1$ through $L_n$, preferably linearly; mouthpiece bore F continually decreases from $L_1$ through $L_n$, preferably linearly; cavity bore G continually decreases from $L_1$ through $L_n$, preferably linearly; cavity volume H continually decreases from $L_1$ through $L_n$.

In the preferred embodiment, B is always greater than C, and D is always greater than E, such that both the barrel wall thickness and the noted transverse span are tapered. In alternate embodiments, the barrel wall thickness and/or the transverse span may be untapered, i.e. straight.

Further, in the preferred embodiment, the parameter A−B, i.e. the difference between A and B, varies as illustrated in the table, namely such difference continually increases from $L_1$ through $L_9$, preferably linearly, as further illustrated in FIG. 4.

Further, in the preferred embodiment, in a plot, FIG. 5, of transverse thickness B of barrel wall 46 versus axial thickness A of lip 52 for liners $L_1$ through $L_9$, B decreases as A increases. Further preferably, B decreases linearly with respect to A.

Further in the preferred embodiment, in a plot, FIG. 6, of transverse span D versus axial thickness A of lip 52 for $L_1$ through $L_9$, D decreases as A increases. Further preferably, D decreases linearly with respect to A. In another preferred embodiment, D increases as A increases, the latter being preferred when using the manufacturing method described hereinbelow.

Figure 7:
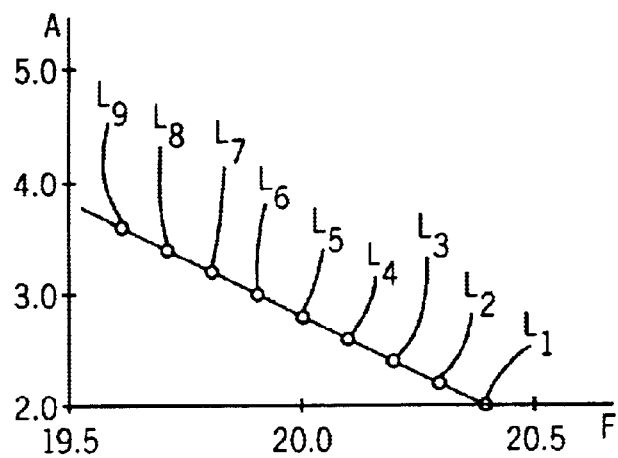
FIG. 7 is a graphical plot of the variance of another pair of parameters versus each other in accordance with the parent invention.

Further in the preferred embodiment, in a plot, FIG. 7, of axial thickness A of lip 52 versus mouthpiece bore F for $L_1$ through $L_9$, axial thickness A decreases as mouthpiece bore F increases. Further preferably, A decreases linearly with respect to F.

Figure 8:
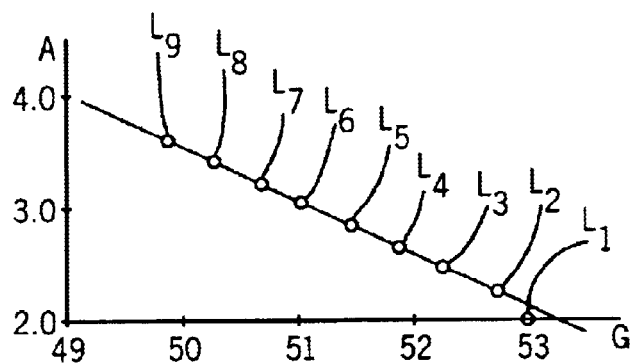
FIG. 8 is a graphical plot of the variance of another pair of parameters versus each other in accordance with the parent invention.

Further in the preferred embodiment, in a plot, FIG. 8, of axial thickness A of lip 52 versus cavity bore G for $L_1$ through $L_9$, axial thickness A decreases as cavity bore G increases. Further preferably, A decreases linearly with respect to G.

Figure 9:
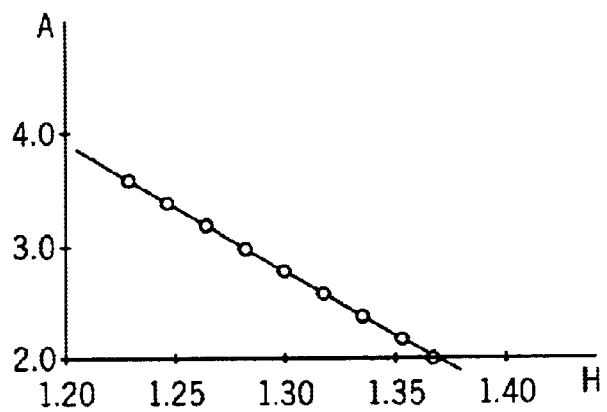
FIG. 9 is a graphical plot of the variance of another pair of parameters versus each other in accordance with the parent invention.

Further in the preferred embodiment, in a plot, FIG. 9, of axial thickness A of lip 52 versus cavity volume H for $L_1$ through $L_9$, axial thickness A decreases as cavity volume H increases. Further preferably, A decreases linearly with respect to H.

The disclosed combination enables selection of desired milking characteristics. Liner $L_1$ provides the highest milk harvest and highest milk speed, but also the greatest liner slip. Liner $L_9$ provides the lowest liner slip and also the lowest milk harvest and milking speed. The dairyman can choose the right balance and trade-off for his particular needs. As he moves left to right in FIG. 3, liner slip reduces as does milk harvest and milking speed. As he moves right to left in FIG. 3, liner slip increases as does milk harvest and milking speed.

Figure 10:
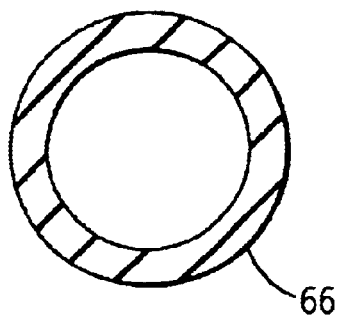
FIG. 10 is a cross-sectional view of a liner.
Figure 11:
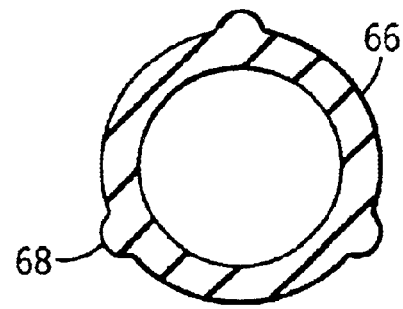
FIG. 11 is like FIG. 10 and shows another embodiment.
Figure 12:
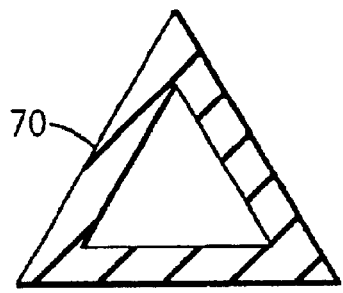
FIG. 12 is like FIG. 10 and shows another embodiment.
Figure 13:
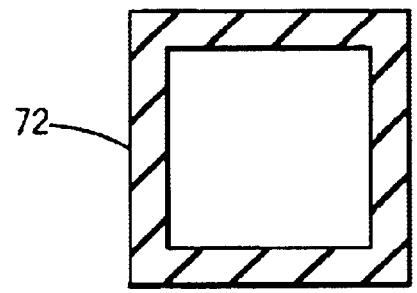
FIG. 13 is like FIG. 10 and shows another embodiment.
Figure 14:
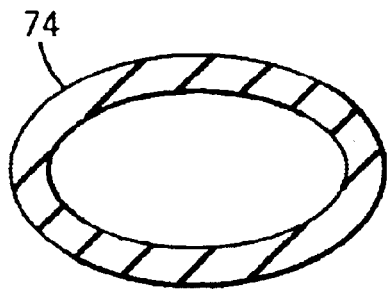
FIG. 14 is like FIG. 10 and shows another embodiment.
Figure 15:
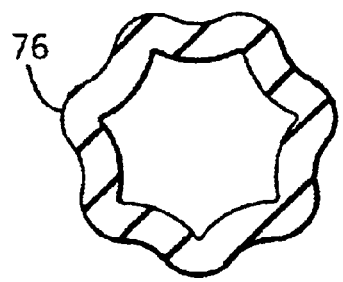
FIG. 15 is like FIG. 10 and shows another embodiment.

The liner is preferably round as shown at 66 in FIG. 10. The liner may additionally include a plurality of ribs such as 68, FIGS. 11 and 2, extending axially along the barrel. The ribs may be external as shown, and/or internal. The liner may be triangular as shown at 70 in FIG. 12. The liner may be square as shown at 72 in FIG. 13. The liner may be oval as shown at 74 in FIG. 14. The liner may be fluted as shown at 76 in FIG. 15.

The various combinations of parameters providing the noted selectivity of milking characteristics are set forth in the claims. Deflection of lip 52 is varied by parameter A, and may additionally or alternately be varied by varying the shore hardness of the lip material. Liner barrel tension is varied by varying the noted wall thickness B and C, and may alternately or additionally be varied by the addition of the noted ribs and/or changing the cross-section of individual ribs and/or changing liner material and/or changing barrel length.

Figure 16:
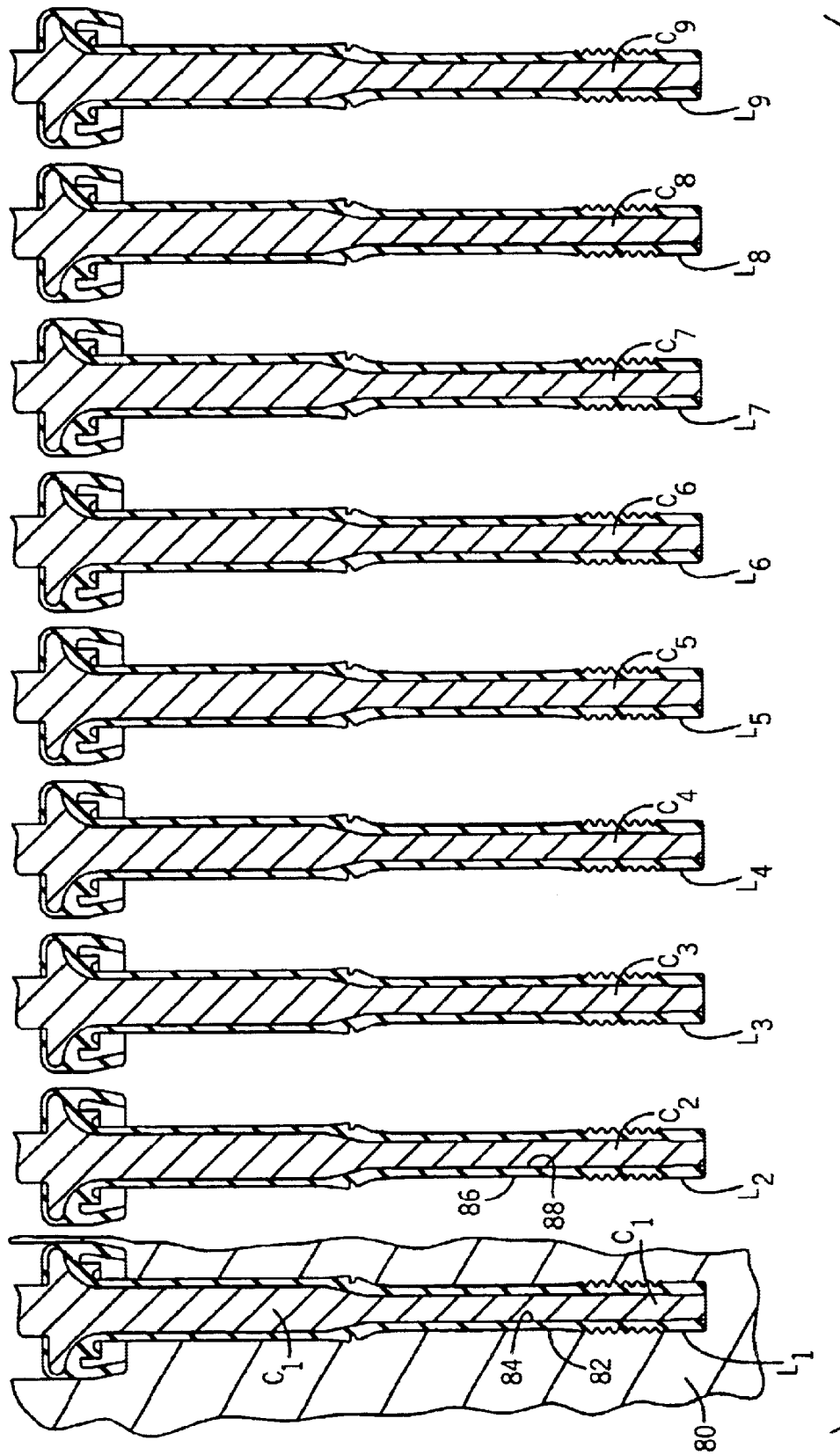
FIG. 16 is like FIG. 3 and illustrates a manufacturing method in accordance with the parent invention.

There is further provided a simple and particularly cost effective and economical manufacturing method for making the teatcup liner series. The method involves: forming a first of the liners $L_1$ in a mold 80, FIG. 16, having a first removable core $C_1$ inserted therein, the mold forming the outer profile surface 82 of liner $L_1$, the core $C_1$ forming the inner profile surface 84 of liner $L_1$; forming a second of the liners $L_2$ in the same mold 80 having a second removable core $C_2$ inserted therein, the mold 80 forming the outer profile surface 86 of liner $L_2$, the core $C_2$ forming the inner profile surface 88 of liner $L_2$; forming the remainder of the liners through $L_n$, e.g. $L_3$ through $L_9$, in the same mold 80 having respective removable cores through $C_n$, e.g. $C_3$ through $C_9$, inserted therein, the mold 80 forming the outer profile surface of the liners through $L_n$, the cores through $C_n$ forming the inner profile surfaces of the liners through $L_n$, e.g. cores $C_3$ through $C_9$ form the inner profile surfaces for liners $L_3$ through $L_9$, respectively. The same mold 80 is used for each of the liners $L_1$ through $L_9$. The outer profile surface is the same for each of liners $L_1$ through $L_9$. Different cores $C_1$ through $C_9$ are used for liners $L_1$ through $L_9$. The inner profile surface is different from liner to liner according to $C_1$ through $C_9$. Any or all or some combination of the noted parameters A–H are varied liner to liner according to $C_1$ through $C_9$. The cores change a selected dimensional parameter or parameters. This is particularly desirable from a manufacturing standpoint because of the savings in tooling cost by using a single mold to produce the liner series, rather than multiple molds, i.e. one for each liner. Instead, different cores are used to provide the variance liner to liner in the series. Cores are significantly less expensive than a mold.

Present Invention

FIG. 17 shows the first and last of a teatcup liner series 100 including in combination a family of related teatcup liners such as 102, 104, etc. Each liner has an upper mouthpiece 106, a barrel 108 depending downwardly from the upper mouthpiece, and a lower connecting tube 110 depending downwardly from the barrel. The barrel extends axially along an axis 112 for receiving a teat 22, FIG. 1, inserted axially thereinto through mouthpiece 106. The teatcup liner series includes n liners $L_1$ through $L_n$, e.g. $L_1$ through $L_9$, as above. The material of at least one of the mouthpiece and the barrel progressively varies in hardness from $L_1$ to $L_9$. In this embodiment, all of the liners in the liner series 100, namely $L_1$ to $L_9$ in FIG. 17, have the same dimensions, including barrel wall thickness at the top of the barrel, dimension B above (e.g. 3.30 mm), liner ID (internal diameter) bore or transverse span, dimension D above (e.g. 20 mm), and mouthpiece lip thickness, dimension A above (e.g. 3.80 mm), etc. In FIG. 17, liners $L_1$ through $L_n$ are dimensionally the same. The difference between liners $L_1$ through $L_n$ in FIG. 17 is the hardness of the rubber compound that is used to make different parts of the liners. The material of at least one of the mouthpiece 106 and the barrel 108 progressively varies in hardness from $L_1$ to $L_9$.

The material of mouthpiece 106 progressively increases in hardness from $L_1$ to $L_9$. In one embodiment, the mouthpiece of liner $L_1$ is a soft rubber compound of 36 Shore hardness, and the mouthpiece of liner $L_9$ is a harder rubber compound of 44 Shore hardness. The opposite is true for barrel 108. The material of the barrel 108 progressively decreases in hardness from $L_1$ to $L_9$. In one embodiment, barrel 108 of liner $L_1$ is a harder rubber compound, namely 44 Shore hardness, and the barrel of liner $L_9$ is a softer rubber compound, namely 36 Shore hardness. Further in the preferred embodiment, the liners $L_1$ through $L_9$ at respective mouthpieces 106 and barrels 108 change in their hardness by one Shore hardness liner to liner. The material of mouthpiece 106 progressively increases in hardness from $L_1$ to $L_n$.

The material of barrel 108 progressively decreases in hardness from $L_1$ to $L_n$. It is preferred that in combination the material of both mouthpiece 106 and barrel 108 progressively vary from $L_1$ to $L_n$ and further preferably that the material of mouthpiece 106 and the material of barrel 108 vary inversely relative to each other from $L_1$ to $L_n$. It is further preferred that lower connecting tube 110 remain substantially the same hardness from $L_1$ to $L_9$ preferably a harder rubber compound, preferably 44 Shore hardness.

FIG. 18 shows another embodiment including a teatcup liner series 120 including in combination a family of related teatcup liners such as 122 through 124, each liner having an upper mouthpiece 126, a barrel 128 depending downwardly from the upper mouthpiece, and a lower connecting tube 130 depending downwardly from the barrel. The barrel extends axially along an axis 132 for receiving a teat 22, FIG. 1, inserted axially thereinto through mouthpiece 126. The teatcup liner series includes n liners $L_1$ through $L_n$, such as $L_1$ through $L_9$. A plurality of grooves 134 extend along at least one of mouthpiece 126 and barrel 128. The grooves have a groove width 136, FIG. 18, measured transversely to axis 132 and arcuately partially circumferentially around the hollow interior of the liner. The grooves also have a groove width 138, FIG. 20, measured transversely to axis 132 and taken radially relative thereto. The groove widths 136, 138 progressively vary from $L_1$ to $L_9$.

In one embodiment, the noted grooves extend along the mouthpiece as shown at 140, and the noted groove width progressively decreases in the mouthpiece from $L_1$ to $L_9$, as shown at respective groove widths 142 and 144. Mouthpiece 126 has an upper lip 146 having an aperture 148 therethrough for receiving teat 22. Mouthpiece 126 has a cavity 150 between lip 146 and barrel 128. The noted grooves extend along cavity 150, and the noted groove width in the cavity progressively decreases from $L_1$ to $L_9$, as shown by the decrease from groove width 142 to groove width 144. The noted grooves 134 also extend axially along barrel 128, as shown at 152, and the groove width along the barrel progressively increases from $L_1$ to $L_9$, as shown at the increase in groove width from 154 to 156. It is preferred that both the lateral circumferential groove width increase from $L_1$ to $L_9$, and also the radial groove width increase from $L_1$ to $L_9$, as shown at the increase from 158 to 160, FIGS. 19, 20.

In the preferred embodiment, grooves 134 extend along both the mouthpiece 126 and the barrel 128. The grooves have upper sections 162 in the mouthpiece, and have lower sections 164 in the barrel. It is preferred that in combination the groove width of the upper sections 162 of the grooves progressively decreases from $L_1$ to $L_9$, and the groove width of the lower sections 164 of the grooves progressively increases from $L_1$ to $L_9$.

Further in accordance with the invention, the noted upper sections, e.g. 140, 162 of the grooves have a different groove width than the lower sections e.g. 152, 164 of the grooves. For liner 122, $L_1$ in FIG. 18, upper sections 140 of the grooves have a larger groove width 142 than the groove width 154 of lower sections 152 of the grooves. For liner 124, $L_9$ in FIG. 18, the upper sections of the grooves have a smaller groove width 144 than the groove width 156 of the lower sections of the grooves. The grooves extend upwardly along barrel 128 and then along cavity 150 and lip 146 to aperture 148. Groove transition sections 158, $L_1$, 160, $L_9$, transition the grooves to the noted different groove width.

Liner $L_1$ in FIG. 17 and liner $L_1$ in FIG. 18 provide faster milking. Liner $L_9$ in FIG. 17 and liner $L_9$ in FIG. 18 provide less slip.

FIG. 21 shows another embodiment including a teatcup liner series 170 including in combination a family of related teatcup liners such as 172 through 174, each liner having an upper mouth piece 176, a barrel 178 depending downwardly from the upper mouthpiece, and a lower connecting tube 180 depending downwardly from the barrel. The barrel extends axially along an axis 182 for receiving a teat 22, FIG. 1, inserted axially thereinto through mouthpiece 176, namely through aperture 184 of upper lip 186. The teatcup liner series includes N liners $L_1$ through $L_n$, such as $L_1$ through $L_9$. A plurality of grooves 188 extend along at least one of mouthpiece 176 and barrel 178. The grooves have a groove width 190 progressively varying from $L_1$ to $L_9$. Groove width 190 extends axially. The grooves also have a groove width 192 progressively varying from $L_1$ to $L_9$. Groove width 192 extends transversely to axis 182, namely radially relative thereto. Grooves 188 extend transversely to axis 182, namely arcuately circumferentially around the hollow interior of the liner. Mouthpiece 176 has a cavity 194 between lip 186 and barrel 178. The grooves may extend along the barrel as shown at 188 and there may also be grooves as shown at 196 extending along and around cavity 194.

In one embodiment, the axial groove width 190 of grooves 188 extending around the hollow interior of barrel 178 progressively increases from $L_1$ to $L_9$, as shown by the increase from axial groove width 198 to axial groove width 200. Radial groove width 192 of grooves 188 also progressively increases from $L_1$ to $L_9$, as shown by the increase from radial groove width 202 to radial groove width 204. The axial and/or radial groove widths of grooves 196 in cavity 194 of mouthpiece 176 may also be varied. In one embodiment, the groove widths of grooves 196 increase from $L_1$ to $L_n$ and/or groove structure is otherwise modified or varied to provide a stiffer lip for liner $L_9$ than liner $L_1$ to provide less liner slip for liner $L_9$. For example, the number or size of grooves such as 206, 208 may be varied to remove more or less material, or to control deflection as in co-pending U.S. patent application Ser. No. 10/359,848, filed Feb. 7, 2003, incorporated herein by reference. Each of the vertical axial groove structure of FIG. 18 and the horizontal lateral groove structure of 21 removes material from the barrel wall in a controlled progressive manner to vary milking characteristics as noted, e.g. providing faster milking as one moves right to left in FIGS. 21 and 18 from liner $L_9$ to liner $L_1$.

It is recognized that various equivalents, alternatives and modifications are possible within the scope of the appended claims.

What is claimed is:

1. A teatcup liner series comprising in combination a family of related teatcup liners, each liner having an upper mouthpiece and a barrel depending downwardly from said upper mouthpiece, said barrel extending axially along an axis for receiving a teat inserted axially thereinto through said mouthpiece, said teatcup liner series comprising n liners $L_1$ through $L_n$, wherein the material of at least one of said mouthpiece and said barrel progressively varies in hardness from $L_1$ to $L_n$.

2. The teatcup liner series according to claim 1 wherein the material of said mouthpiece progressively increases in hardness from $L_1$ to $L_n$.

3. The teatcup liner series according to claim 1 wherein the material of said barrel progressively decreases in hardness from $L_1$ to $L_n$.

4. The teatcup liner series according to claim 1 wherein in combination the material of both said mouthpiece and said barrel progressively vary from $L_1$ to $L_n$.

5. The teatcup liner series according to claim 1 wherein the material of said mouthpiece and the material of said barrel vary inversely relative to each other from $L_1$ to $L_n$.

6. The teatcup liner series according to claim 5 wherein in combination the material of said mouthpiece progressively increases in hardness from $L_1$ to $L_n$, and the material of said barrel progressively decreases in hardness from $L_1$ to $L_n$.

7. A teatcup liner series comprising in combination a family of related teatcup liners, each liner having an upper mouthpiece and a barrel depending downwardly from said upper mouthpiece, said barrel extending axially along an axis for receiving a teat inserted axially thereinto through said mouthpiece, said teatcup liner series comprising n liners $L_1$ through $L_n$, a plurality of grooves extending along at least one of said mouthpiece and said barrel, said grooves having a groove width progressively varying from $L_1$ to $L_n$.

8. The teatcup liner series according to claim 7 wherein said groove width extends transversely to said axis.

9. The teatcup liner series according to claim 8 wherein said grooves extend along said mouthpiece, and said groove width progressively decreases from $L_1$ to $L_n$.

10. The teatcup liner series according to claim 9 wherein said mouthpiece has an upper lip having an aperture therethrough for receiving said teat, and said mouthpiece has a cavity between said lip and said barrel, and said grooves extend along said cavity, and said groove width in said cavity progressively decreases from $L_1$ to $L_n$.

11. The teatcup liner series according to claim 8 wherein said grooves extend axially along said barrel, and said groove width progressively increases from $L_1$ to $L_n$.

12. The teatcup liner series according to claim 8 wherein said grooves extend along both said mouthpiece and said barrel, said grooves having upper sections in said mouthpiece, and having lower sections in said barrel.

13. The teatcup liner series according to claim 12 wherein in combination said groove width of said upper sections of said grooves progressively decreases from $L_1$ to $L_n$, and said groove width of said lower sections of said grooves progressively increases from $L_1$ to $L_n$.

14. The teatcup liner series according to claim 7 wherein said groove width extends axially.

15. The teatcup liner series according to claim 14 wherein said mouthpiece has an upper lip having an aperture therethrough for receiving said teat, and said mouthpiece has a cavity between said lip and said barrel, and said grooves extend along said cavity in said mouthpiece.

16. The teacup liner series according to claim 14 wherein said grooves extend along said barrel, and said groove width progressively increases from $L_1$ to $L_n$.

17. The teatcup liner series according to claim 14 comprising grooves in both said mouthpiece and said barrel.

18. A teatcup liner comprising an upper mouthpiece and a barrel depending downwardly from said upper mouthpiece, said barrel extending axially along an axis for receiving a teat inserted axially thereinto through said mouthpiece, a plurality of grooves extending along said liner and having a groove width measured transversely to said axis, said grooves having upper sections in said mouthpiece, said grooves having lower sections extending axially along said barrel, said upper sections of said grooves having a different groove width than said lower sections of said grooves.

19. The teatcup liner according to claim 18 wherein said upper sections of said grooves have a larger said groove width than said lower sections of said grooves.

20. The teatcup liner according to claim 18 wherein said upper sections of said grooves have a smaller said groove width than said lower sections of said grooves.

21. The teatcup liner according to claim 18 wherein said mouthpiece has an upper lip having an aperture therethrough for receiving said teat, and said mouthpiece has a cavity between said lip and said barrel, said grooves extend upwardly along said barrel and then along said cavity and said lip to said aperture, and comprising groove transition sections along said cavity transitioning said grooves to said different groove width.

22. A method for making a teatcup liner series having in combination a plurality of related teatcup liners, each liner having an upper mouthpiece, an intermediate barrel defined by a barrel wall, and a lower connecting tube, said barrel extending along an axial direction for receiving a teat inserted axially thereinto through said mouthpiece, said mouthpiece having an upper lip having an aperture therethrough for receiving said teat, said teat liner series comprising n said liners $L_1$ through $L_n$, each said liner having an outer profile surface and an inner profile surface, said method comprising:
  forming a first of said liners $L_1$ in a mold having a first removable core $C_1$ inserted therein, said mold forming the outer profile surface of liner $L_1$, said core $C_1$ forming the inner profile surface of liner $L_1$;
  forming a second of said liners $L_2$ in the same said mold having a second removable core $C_2$ inserted therein, said mold forming the outer profile surface of liner $L_2$, said core $C_2$ forming the inner profile surface of liner $L_2$;
  forming the remainder of said liners through $L_n$ in the same said mold having respective removable cores through $C_n$ inserted therein, said mold forming the outer profile surface of said liners through $L_n$, said cores through $C_n$ forming the inner profile surfaces of the liners through $L_n$,
  wherein:
    the same said mold is used for each of said liners $L_1$ through $L_n$;
    the outer profile surface is the same for each of said liners $L_1$ through $L_n$;
    different cores $C_1$ through $C_n$ are used for said liners $L_1$ through $L_n$; and
    said inner profile surface is different liner to liner according to $C_1$ through $C_n$.

23. The method according to claim 22 wherein said n liners $L_1$ through $L_n$ have at least one selected parameter which varies liner to liner, and wherein said selected parameter varies liner to liner according to $C_1$ through $C_n$.

24. The method according to claim 23 wherein said selected parameter is a dimension.

25. The method according to claim 24 wherein said lip has an axial thickness measured parallel to said axial direction, and said parameter is said axial thickness of said lip.

26. The method according to claim 24 wherein said barrel wall has a transverse thickness measured transversely to said axial direction, and said parameter is said transverse thickness of said barrel wall.

27. The method according to claim 24 wherein said barrel wall has inner surfaces defining a hollow interior with a transverse span thereacross taken transversely to said axial direction, and wherein said parameter is said transverse span.

28. The method according to claim 24 wherein said lip aperture has a transverse dimension taken transversely to said axial direction and defining a mouthpiece bore, and wherein said parameter is said mouthpiece bore.

29. The method according to claim 24 wherein said mouthpiece has a cavity between said lip and said barrel, and said cavity has a transverse dimension taken transversely to said axial direction and defining a cavity bore, and wherein said parameter is said cavity bore.

30. The method according to claim 24 wherein said mouthpiece has a cavity between said lip and said barrel, said cavity having a volume, and wherein said parameter is said cavity volume.

31. A teatcup liner series comprising in combination a plurality of related teatcup liners, each liner having an upper mouthpiece, an intermediate barrel defined by a barrel wall, and a lower connecting tube, said barrel extending along an axial direction for receiving a teat inserted axially thereinto through said mouthpiece, said mouthpiece having an upper lip having an aperture therethrough for receiving said teat, said teatcup liner series comprising n said liners $L_1$ through $L_n$ having at least one selected parameter which varies liner to liner, wherein:
  said lip has an axial thickness measured parallel to said axial direction;
  said barrel wall has a transverse thickness measured transversely to said axial direction;
  said parameter is the difference between said axial thickness of said lip and said transverse thickness of said barrel wall; and
  said difference increases linearly from $L_1$ through $L_n$.

32. A teatcup liner series comprising in combination a plurality of related teatcup liners, each liner having an upper mouthpiece, an intermediate barrel defined by a barrel wall, and a lower connecting tube, said barrel extending along an axial direction for receiving a teat inserted axially thereinto through said mouthpiece, said mouthpiece having an upper lip having an aperture therethrough for receiving said teat, said teatcup liner series comprising n said liners 14 through $L_n$ having at least two selected parameters which vary liner to liner, wherein:
  said lip has an axial thickness measured parallel to said axial direction;
  said barrel wall has a transverse thickness measured transversely to said axial direction;
  one of said parameters is the difference between said axial thickness of said lip and said transverse thickness of said barrel wall; and
  said difference increases from $L_1$ through $L_n$.

33. A teatcup liner series comprising in combination a plurality of related teatcup liners, each liner having an upper mouthpiece, an intermediate barrel defined by a barrel wall, and a lower connecting tube, said barrel extending along an axial direction for receiving a teat inserted axially thereinto through said mouthpiece, said mouthpiece having an upper lip having an aperture therethrough for receiving said teat, said teatcup liner series comprising n said liners $L_1$ through $L_n$ having at least two selected parameters which vary liner to liner, wherein:
  said lip has an axial thickness A measured parallel to said axial direction;
  said barrel wall has a transverse thickness B measured transversely to said axial direction;
  one of said parameters is A;
  another of said parameters is B; and
  A and B vary inversely and linearly relative to each other from $L_1$ through $L_n$.

34. A teatcup liner series comprising in combination a plurality of related teatcup liners, each liner having an upper mouthpiece, an intermediate barrel defined by a barrel wall, and a lower connecting tube, said barrel extending along an axial direction for receiving a teat inserted axially thereinto through said mouthpiece, said mouthpiece having an upper lip having an aperture therethrough for receiving said teat, said teatcup liner series comprising n said liners $L_1$ through $L_n$ having at least three selected parameters which vary liner to liner, wherein:

said lip has an axial thickness A measured parallel to said axial direction;

said barrel wall has a transverse thickness B measured transversely to said axial direction;

one of said parameters is A;

another of said parameters is B; and

A and B vary inversely relative to each other from $L_1$ through $L_n$.

35. A teatcup liner series comprising in combination a family of related teatcup liners, each liner having an upper mouthpiece and a barrel depending downwardly from said upper mouthpiece, said barrel extending axially along an axial direction for receiving a teat inserted axially thereinto through said mouthpiece, said mouthpiece having an upper lip having an aperture therethrough for receiving said teat, said teatcup liner series comprising in combination n said liners $L_1$ through $L_n$ having at least one selected parameter which varies liner to liner, said lip having an axial thickness measured parallel to said axial direction, wherein said parameter is said axial thickness of said lip.

36. The teatcup liner series according to claim 35 wherein said axial thickness of said lip progressively increases from $L_1$ through $L_n$.

37. A teatcup liner series comprising in combination a family of related teatcup liners, each liner having an upper mouthpiece and a barrel depending downwardly from said upper mouthpiece, said barrel extending axially along an axial direction for receiving a teat inserted axially thereinto through said mouthpiece, said teatcup liner series comprising n said liners $L_1$ through $L_n$ having at least one selected parameter which varies liner to liner, each liner having at least one groove extending along said mouthpiece, wherein said parameter is at least one of the size and number of said grooves.

38. The teatcup liner series according to claim 37 wherein said parameter is said size of said grooves, and wherein said size of said grooves varies liner to liner.

* * * * *